(12) United States Patent
Pfestorf

(10) Patent No.: US 8,096,474 B2
(45) Date of Patent: Jan. 17, 2012

(54) METHOD FOR DECODING DATA

(75) Inventor: Christian Pfestorf, Frankfurt am Main (DE)

(73) Assignee: Hochschule Darmstadt, Darmstadt (DE)

( * ) Notice: Subject to any disclaimer, the term of this patent is extended or adjusted under 35 U.S.C. 154(b) by 496 days.

(21) Appl. No.: 12/278,161

(22) PCT Filed: Feb. 1, 2007

(86) PCT No.: PCT/EP2007/000868
§ 371 (c)(1),
(2), (4) Date: Oct. 23, 2008

(87) PCT Pub. No.: WO2007/088054
PCT Pub. Date: Aug. 9, 2007

(65) Prior Publication Data
US 2009/0032596 A1 Feb. 5, 2009

(30) Foreign Application Priority Data
Feb. 2, 2006 (DE) .......................... 10 2006 005 202

(51) Int. Cl.
*G06K 7/10* (2006.01)

(52) U.S. Cl. ......... 235/454; 235/380; 235/375; 235/487

(58) Field of Classification Search ................. 235/454, 235/380, 375, 494, 487
See application file for complete search history.

(56) References Cited

U.S. PATENT DOCUMENTS

| 5,612,524 | A | 3/1997 | Sant Anselmo et al. |
| 6,182,901 | B1 * | 2/2001 | Hecht et al. ................. 235/494 |
| 2002/0021284 | A1 | 2/2002 | Wiebe |
| 2005/0178846 | A1 * | 8/2005 | Silverbrook ................. 235/494 |

FOREIGN PATENT DOCUMENTS

EP 0564708 A2 10/1993

OTHER PUBLICATIONS

International Search Report for corresponding International Application PCT/EP2007/000868.

* cited by examiner

*Primary Examiner* — Karl D. Frech
(74) *Attorney, Agent, or Firm* — WRB-IP LLP

(57) ABSTRACT

Disclosed is a method for decoding data that is encoded on a medium in a two-dimensional arrangement of code symbol marks (12). According to said method, orientation symbol marks (7) are disposed in several rows and several columns such that a grid of row centerlines and column centerlines is adjusted to the read orientation symbol marks (7) by determining a step width for the rows and the columns while read code symbol marks (12) are assigned to one respective point of intersection of the adjusted grid, said point of intersection being linkable to a defined piece of data. The step width of the rows is different from the step width of the columns, and a relative orientation of the two-dimensional arrangement of code symbol marks (12) is determined from the ratio between the two step widths. A data range (10) that is used for code symbol marks (12) is determined from a reference symbol mark (8). The code symbol marks (12) and the orientation symbol marks (7) are distinguished based on a characteristic, distinct graphic design and are allocated, respectively.

8 Claims, 4 Drawing Sheets

METHOD FOR DECODING DATA

BACKGROUND AND SUMMARY

The invention concerns a method for decoding data that is encoded on a medium in a two-dimensional arrangement of code symbol marks wherein the two-dimensional arrangement comprises a data range within which the position of each code symbol mark is linkable to certain data, wherein the two-dimensional arrangement comprises orientation symbol marks that define the data range and wherein the two-dimensional arrangement of code symbol marks and orientation symbol marks is read by way of a code reader.

Using an arrangement of code symbol marks it is possible to store data on the surface of a medium so that they can be electronically recorded and decoded. A large number of code symbol marks, often called barcodes, and two-dimensional arrangements, also called matrix codes, are known.

The first barcodes were developed and described more than fifty years ago. In the meantime different embodiments of barcode and matrix codes have been standardized on a country-specific and/or international basis and are widely used for marking products or for identification purposes in general.

Matrix codes with a two-dimensional arrangement of code symbol marks that in most cases are comprised of dark or light squares or pixels make it possible to store large amounts of data on a small area: Using customary error correction processes it is possible to recognize unreadable or damaged areas of the matrix code and in many cases to determine the missing data.

There are matrix codes (EP 1 523 726 B1) in which the size of the individual code symbol marks is given such that when a matrix code area is read, each code symbol corresponds to approximately one pixel of the reading device used for reading the optical resolution and thus of the generated image file, to allow for simple and reliable decoding and processing of the matrix code. [sic] The size of the code symbol marks and thus the dimensions of the matrix code are defined and determined by the resolution of the code reader. A variation of the code symbol marks or the area covered by the matrix code is not possible or is relatively complicated.

Other methods for decoding matrix codes are known (EP 0 564 708 B1), in which the area designated for the arrangement of the code symbol marks is defined by indication lines in a horizontal as well as a vertical direction. Such indication lines define a rectangular area for the code symbol marks. By using suitable division marks along the indication lines it is possible to electronically determine a scaling of the matrix code, which then can be considered during decoding. If, however, the indication lines are partially or wholly damaged or unreadable, the area covered with code symbol marks cannot be reliably determined and read out error-free. The indication lines only cover a small area located at the edge of the matrix code. Frequent read errors or damage in these areas cannot be corrected with the customary error correction methods when indication lines are used so that even minor damage or small unreadable areas of the indication lines of the otherwise readable matrix code become completely unreadable.

It is desirable to provide a method for decoding data in a two-dimensional arrangement according to the type described in the introduction such that the area designated for code symbol marks preferably can be selected and defined randomly and error-free decoding is possible even if a partial area of the two-dimensional arrangement is unreadable or damaged.

According to an aspect of the invention the orientation symbol marks are disposed in several rows and several columns such that a grid of row centerlines and column centerlines is adjusted to the read orientation symbol marks by determining a step width for the rows and a step width for the columns and while the read code symbol marks then are assigned to one respective point of intersection of the adjusted grid, said point of intersection being linkable to a defined piece of data. Due to the freely definable arrangement of the orientation symbol marks the distances between individual code symbol marks as well as the dimensions of the two-dimensional arrangement of the area covered with code symbol marks can be defined almost at will. The corresponding area does not necessarily have to be rectangular.

The orientation symbol marks are used only for determining the geometric properties of the data range, in which the code symbol marks that are arranged there can be linked unambiguously to a defined piece of data.

If a sufficiently large number of orientation symbol marks are used, the data range can still be reliably determined and defined if some or even the majority of the orientation symbol marks are damaged, cannot be read, or are completely missing.

Partially unreadable code symbol marks or data that therefore is not captured can be reconstructed with the help of known error correction methods as well as redundant data storage and coding. Such methods and measures are sufficiently described and known in connection with already existing decoding methods especially for existing matrix codes.

Since the orientation symbol marks do not need to be linkable to a defined piece of data, the arrangement or the design of the orientation symbol marks can be selected almost at will and can also be used for other purposes that are not necessarily connected to the decoding of the code symbol marks and can be adjusted accordingly. For example, the orientation symbol marks can be designed and arranged so that they display a logo, an image or an esthetic graphic design that a viewer can recognize. Therefore it also is feasible for the greater part of the two-dimensional arrangement to be covered with orientation symbol marks and a correspondingly small amount of data to be coded or to be reliably coded in only a comparatively small data range or based on a small number of code symbol marks, which is sufficient for certain applications. Additional data can be transmitted to provide a graphic design using orientation symbol marks that offer a perceivable meaning for the human viewer.

According to one embodiment of the invention the grid is adjusted to the read orientation symbol marks by determining an angle between the row centerlines and column centerlines.

Due to the fact that the rows and columns of the orientation symbol marks can be arranged relative to each other at an angle, the two-dimensional arrangement of the symbol marks is not restricted to right-angle grids. This allows, for example, adjusting the data range to a non-rectangular area in the best possible manner so as to use the available area advantageously and to use it for storing or decoding large amounts of data. By defining an angle between the row and the column centerlines it is possible to make an unambiguous orientation of the two-dimensional arrangement of symbol marks possible automatically.

Preferably the step width of the rows is different from the step width of the columns so that the relative orientation of the two-dimensional arrangement of the data symbol marks is determined based on the ratio between the two step widths. If the two step widths are different, it is possible to define and take into consideration when reading the symbol marks that the distance between the individual symbol marks in horizontal direction is larger than the distance of the symbol marks in vertical direction. This means it is possible to reliably determine the relative orientation and thus the horizontal or vertical direction of the symbol marks independent of the direction of the individual symbol marks relative to the code reader.

The absolute orientation of the symbol marks, which allows for an unambiguous allocation of the read code symbol marks with the determined intersecting points of the adjusted grid and the linked data, can be defined by the arrangement of the orientation points in a non-mirror image arrangement, etc., for example.

According to an especially advantageous embodiment of the invention the two-dimensional arrangement comprises reference symbol marks that are used to detect and determine the data range. If multiple reference symbol marks are used, through the number and position of the reference symbol marks, the position as well as the size of the data range can be displayed and determined during decoding, based on the reference symbol marks. If the size of the data range is predefined, one single reference symbol mark can be sufficient, if the data range is suitably positioned, to reliably and unambiguously determine the position of the data range during decoding.

It is possible to define the data range and the orientation range within the two-dimensional arrangement in a manner that ensures that the two ranges do not overlap. In this case the differentiation of the symbol marks into code symbol marks and orientation symbol marks can be based solely on assignment to one of the two ranges so that it is possible to obtain uniform symbol marking for code symbol marks and orientation symbol marks. To be able to better use the available area, it also is feasible to define the two ranges so that they overlap or are identical and to distinguish the code symbol marks and the orientation symbol marks based on a different graphic design of the symbol marks. The distinct graphic design can deviate in shape, size or color, for example, or in random combinations of these characteristics. This makes it possible to distinguish and assign the data symbol marks and the orientation symbol marks in each case based on a characteristic and distinguishable graphic design.

It also is possible to provide that multiple orientation symbol marks be arranged in close vicinity to one another and basically be connected. For example, it is possible to provide that all orientation symbol marks be arranged at a distance of a few, for example, two or three, rows or columns, from an adjacent orientation symbol mark.

If, on the other hand, it is defined that code symbol marks must be arranged individually and at a large distance from all adjacent symbol marks, the amount of all orientation symbol marks can be determined based on the adjacent symbol marks without requiring a special identification of the orientation symbol marks or without defining an area for the arrangement of the orientation symbol marks. The amount and arrangement of the orientation symbol marks therefore are freely selectable for the generation of the two-dimensional arrangement of symbol marks and can be almost randomly defined, so that a dynamic adjustment of the symbol marks to the data that are to be coded in individual cases or to the available area is possible.

According to an embodiment of the invention, the two-dimensional arrangement comprises data source symbol marks based on which a data source with defined data can be determined that is linkable with the points of intersection of the grid. The data source symbol marks can also be recognized and analyzed either based on their arrangement in a non-overlapping area within the two-dimensional arrangement or based on a distinct graphic design. For example, it is possible for defined data to be stored in data sources provided within companies, public institutions or countries, and to be accessed by the respective company, public institution or country during decoding of the code symbol marks.

BRIEF DESCRIPTION OF THE DRAWINGS

In the following paragraphs an exemplary embodiment of the invention is described in more detail and is shown in the drawing. The following is shown.

DETAILED DESCRIPTION

Figure 1:
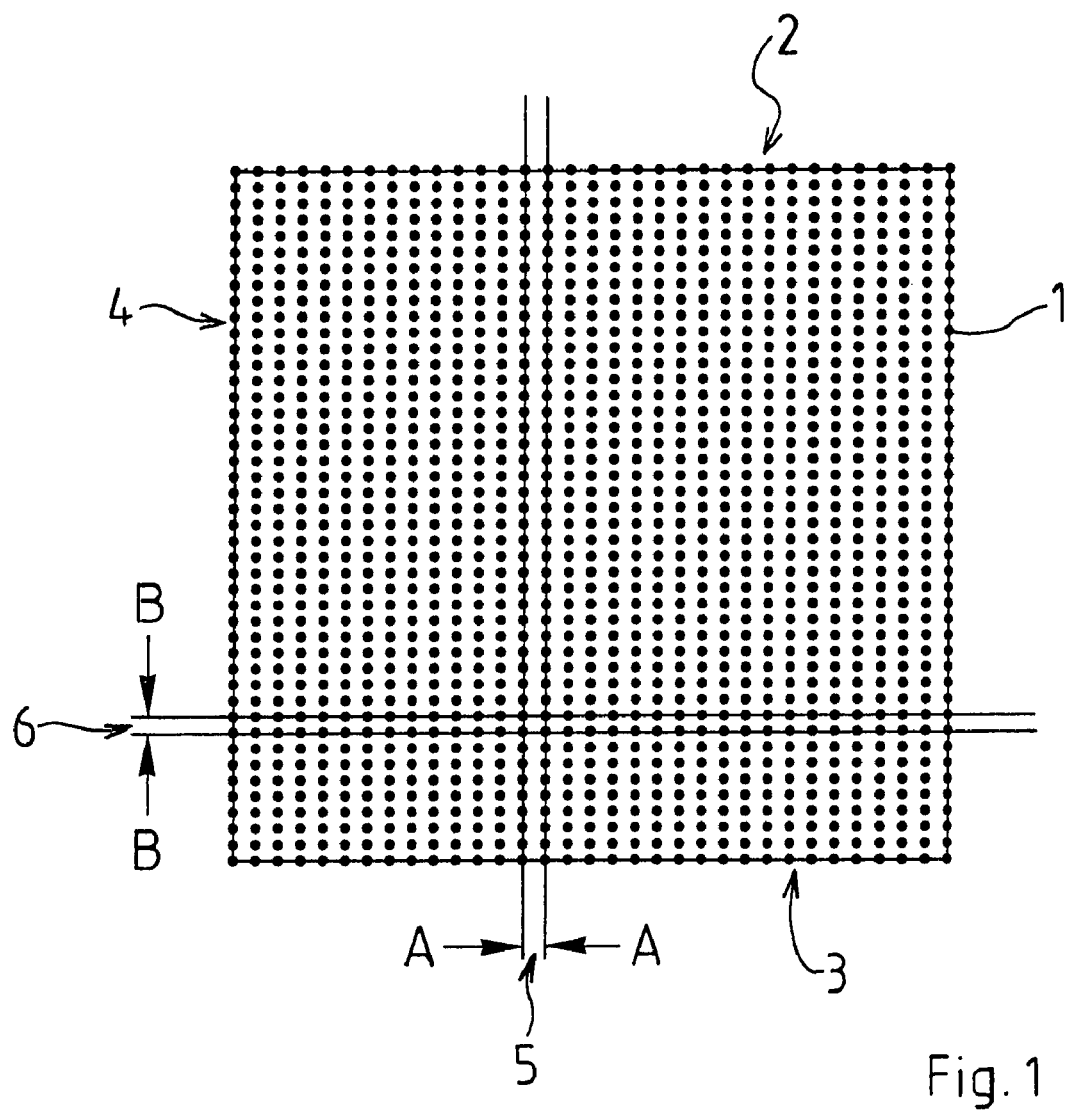
FIG. 1 shows a rectangular arrangement of symbol marks whose step width for the rows is different from the step width of the columns.

For purposes of illustration, FIG. 1 shows a two-dimensional arrangement of symbol marks 1 in a rectangle 2 that is defined by the respective outside rows and columns of the symbol marks 1. The individual symbol marks 1 are columns arranged at a right angle relative to each other, indicated by arrow 3 by way of example, and rows, indicated by arrow 4 by way of example. The two-dimensional arrangement shown in FIG. 1 comprises 44 rows and 33 columns.

The distance between two adjacent columns 3 is called step width of the column 5 and is represented in FIG. 1 by arrows A, by way of example. Analogously the distance between two adjacent rows 4 is called step width of the rows 6 and is represented in FIG. 1 by arrows B, by way of example.

In the exemplary embodiment shown, the step width of the columns 5 is wider than the step width of the rows 6. The ratio between the step width of the columns 5 and the step width of the rows 6 is 2: $\sqrt{2}$ in the Figures shown in the exemplary embodiment. Of course other ratios of the step widths are feasible, whereby it is practical to select a sufficient difference in the step widths in order to allow for a reliable and error-free decoding of data.

In the exemplary embodiment shown, the predefined step width of the columns 5 is larger than the step width of the rows 6, by definition, so that, independent of the read direction, the horizontal or vertical orientation of the symbol marks 1 can be determined, and thereby a relative orientation of the symbol marks 1 can also be determined.

Using known methods it is possible to unambiguously determine the step width of the columns 5 as well as the step width of the rows 6 with only a few symbol marks 1. When the step width of the columns 5 and the step width of the rows 6 is known, it is possible to adjust a grid of row centerlines and column centerlines to the read symbol marks 1.

Figure 2:
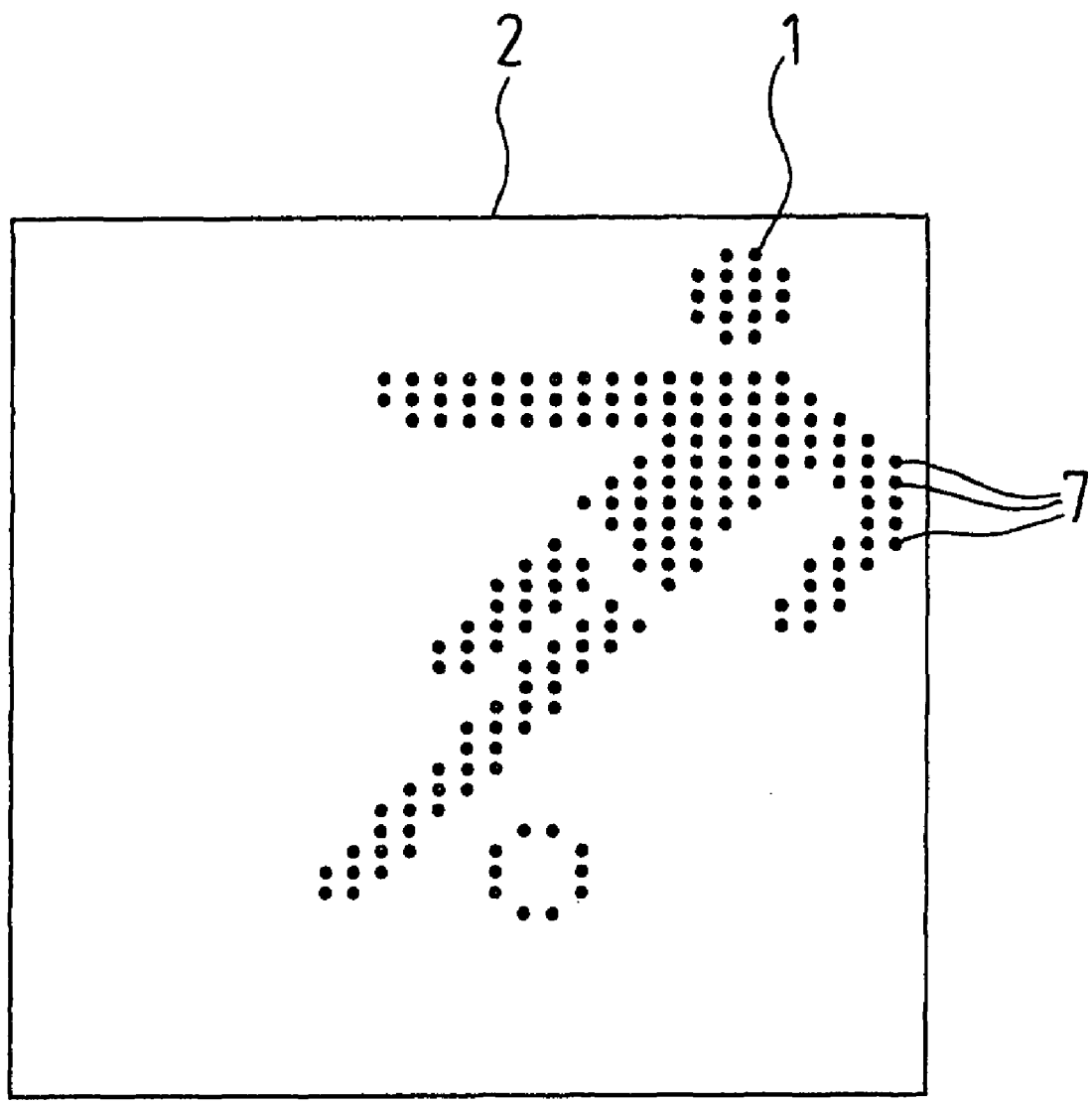
FIG. 2 shows an example of an arrangement of orientation symbol marks in a two-dimensional arrangement according to FIG. 1 in the form of an easily recognizable pictogram.

The exemplary arrangement of symbol marks 1 shown in FIG. 2 includes only orientation symbol marks 7. The orientation symbol marks 7 are arranged within the maximum area of the two-dimensional arrangement, as shown and defined as a rectangle 2 in FIG. 1. For determining the step width of the columns 5 and the step width of the rows 6, however, it is not necessary for the exact location of the maximum area of the two-dimensional arrangement of symbol marks 1 to be defined already. It is not necessary for the edges or, for example, the corners of the maximum area to be marked by orientation symbol marks 7.

Since the orientation symbol marks 7 do not need to be linked to the defined data, they can be arranged randomly. In the present exemplary embodiment the orientation symbol marks 7 are shown in the form of a pictogram and indicate a soccer player, as the human viewer can recognize.

Figure 3:
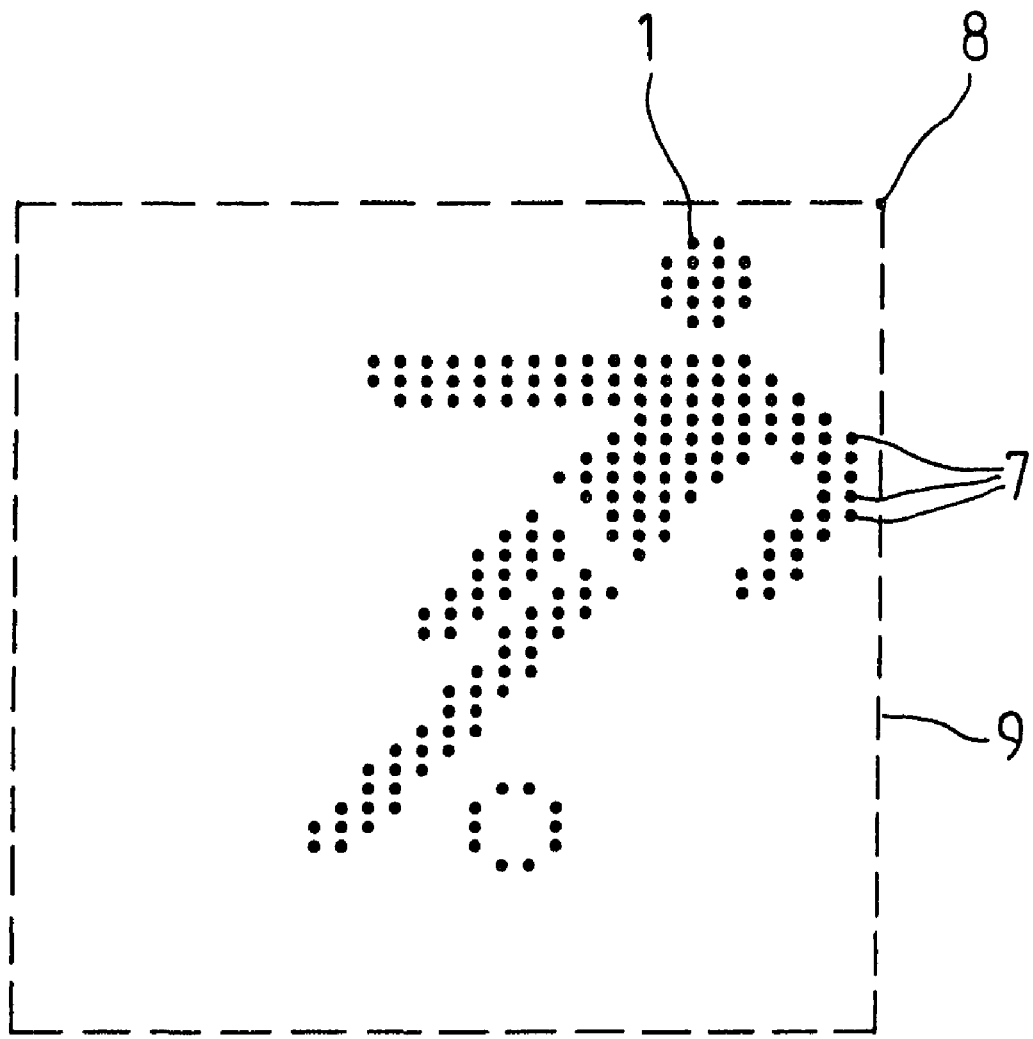
FIG. 3 shows the arrangement shown in FIG. 2 of orientation symbol marks with an additional reference symbol mark and FIG. 4 shows the arrangement shown in FIG. 3 with additional code symbol marks.

In addition to the orientation symbol marks 7, FIG. 3 shows a reference symbol mark 8 in the upper right corner of the maximum area of the two-dimensional arrangement of symbol marks 1. In the exemplary embodiment shown, the reference symbol mark by definition is located in the upper right corner of the maximum area, but would only have to be distinctly recognizable as such, and be arranged within the maximum read area.

Using reference symbol 8 it is possible to distinctly define or determine the orientation and direction of the symbol marks 1. Based on the size of the grid of 33 column centerlines and 44 row centerlines defined for this exemplary embodiment, the orientation symbol marks 7, as well as the reference symbol marks 8, determine the position and the size of the maximum area of the two-dimensional arrangement of rectangle 2. The maximum area of the two-dimensional arrangement of symbol marks 1 that is determined based on the reference symbol marks, is indicated by the dotted lines 9 in FIG. 3 and corresponds to rectangle 2.

Figure 4:
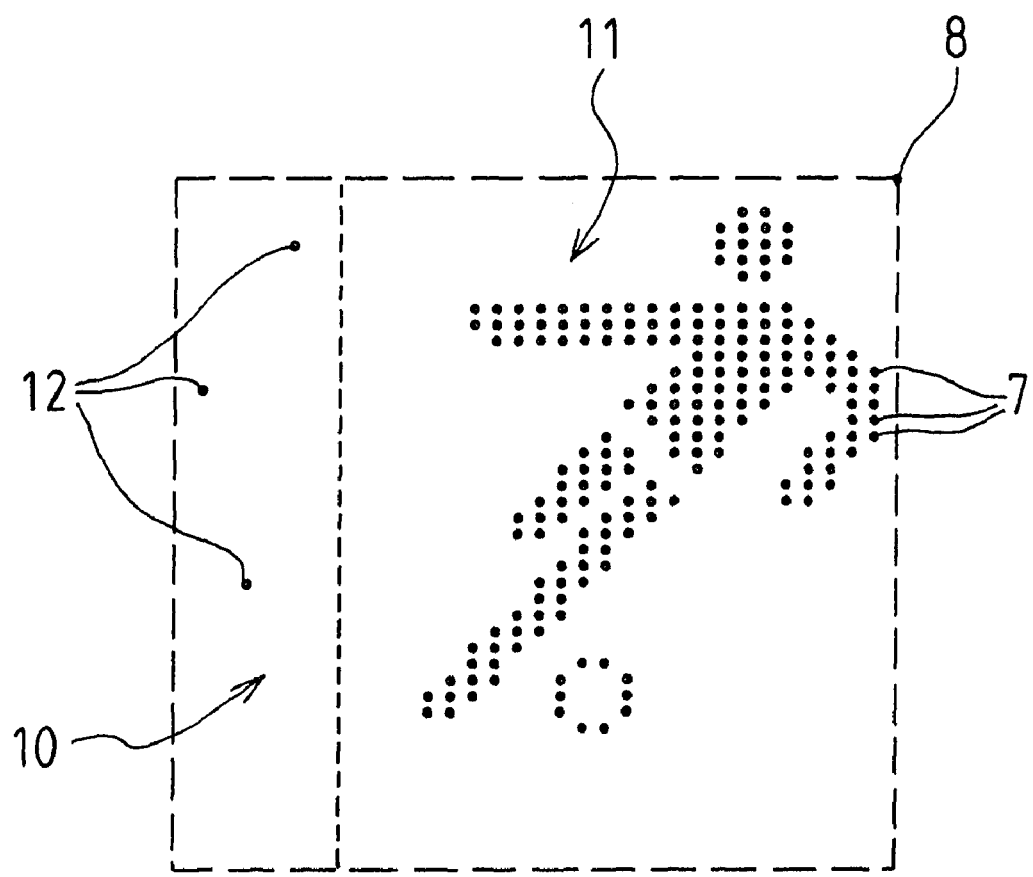

In the exemplary embodiment shown the maximum area of the two-dimensional arrangement is divided into a data range 10 to the left and a non-overlapping adjacent orientation range II shown, by way of example only, in FIG. 4. The data range 10 is 8 columns wide and 44 rows high. To allow for a distinct identification of reference symbol mark 8 and at the same time to be able to use uniform symbol marks 1, the lower rows of the data range 10 are not used.

Three code symbol marks 12 are arranged only by way of example in the data range 10. The position of the code symbol marks 12 can be distinctly linked to predefined data. To this end the code symbol marks 12 are allocated to the respective points of intersection of the grid, which is not shown, with the determined combination of three points of intersection of the grid being linked with data that is defined and accessible in the data source. In the exemplary embodiment shown a large amount of data can be coded with only a few code symbol marks 12 and marked or stored on a surface, with the human viewer seeing primarily the pictogram representation of the soccer player.

The data range 10 and the orientation range 11 can be defined or arranged so that they overlap, i.e., are identical within a two-dimensional arrangement of symbol marks 1, which does not necessarily have to be rectangular. The meaning of the individual symbol marks 1 can be distinguished, for example, based on shape, color or size.

To determine the stored data in the exemplary embodiment described, the following steps are required:

reading of all symbol marks 1 and storage in an image file with sufficient resolution, rotating the read image data until the determined symbol marks 1 are arranged in rows in y-direction and columns in x-direction, determination of the smallest distances between symbol marks 1 in x-direction or y-direction, respectively, and determination of the grid, determination of the reference symbol marks 8 and determination of the maximum area of the two-dimensional arrangement, or the data range 10 and the orientation range 11, and assignment of the code symbol marks 12 to the points of intersection of the grid and querying the linked data stored on a data source.

Deviating from the exemplary process described above, it also is possible to not convert and save the read symbol marks to a digital image file in the first process step, but rather to already identify individual symbols and to save the individual symbol data, as well as their position in a compressed data format that is already prepared for subsequent processing.

The size of the individual symbol marks 1 as well as the dimensions of the rectangle 2 or the data range 10, respectively, and the orientation range 11 can be selected freely. The present method therefore can be used for decoding data that is printed on business cards or large posters, for example. For the human viewer the arrangement of the orientation symbol marks 7 shows a recognizable image in the form of a pictogram or an image, for example, thus transmitting additional data or achieving an esthetic effect.

The above-described method for decoding a two-dimensional arrangement of symbol marks can also be transferred to and used for the three-dimensional arrangement of symbol marks. In order to provide a higher data density and storage capacity, a three-dimensional arrangement of symbol marks is transmitted to multiple two-dimensional arrangements of symbol marks arranged adjacent to one another in a preceding process step and then is decoded.

This means any three-dimensional arrangement of symbol marks, for example generated in a block made of transparent plastic or artificial resin or in the form of a hologram, can be divided into a multi-layer row of two-dimensional arrangements of symbol marks in a first process step, and can then be decoded in suitable order using the above-described method. The position of the individual planes of the two-dimensional arrangements within the three-dimensional arrangement of symbol marks could also be defined based on different step widths of the respective planes in the three spatial directions, for example, and could be determined during decoding.

The invention claimed is:

1. Method for decoding data that is encoded on a medium in a two-dimensional arrangement of code symbol marks, wherein the two-dimensional arrangement comprises a data range, within which the position of each code symbol mark, is linkable to a defined piece of data, wherein the two-dimensional arrangement comprises orientation symbol marks that define the data range and wherein the two-dimensional arrangement of code symbol marks and orientation symbol marks are read by way of a code reader, wherein the orientation symbol marks are disposed in several rows and several columns, comprising adjusting a grid of row centerlines and column centerlines to the read orientation symbol marks by determining the step width for the rows and the step width for the columns and, after determining the step width for the rows and the step width for the columns, assigning read code symbol marks to one respective point of intersection of the adjusted grid, the point of intersection being linkable to a defined piece of data.

2. Method according to claim 1, wherein the grid can be adjusted to the read orientation symbol marks by determining an angle between the row centerlines and the column centerlines.

3. Method according to claim 1, wherein the step width of the rows is different from the step width of the columns and a relative orientation of the two-dimensional arrangement of code symbol marks is determined from the ratio between the two step widths.

4. Method according to claim 1, wherein the two-dimensional arrangement comprises at least one reference symbol mark with which the data range is determined.

5. Method according to claim 1, wherein the code symbol marks and the orientation symbol marks are distinguished and assigned based on a characteristic, distinct graphic design.

6. Method according to claim 1, wherein all orientation symbol marks are arranged at a maximum distance from an adjacent orientation symbol mark of two or more rows or columns.

7. Method according to claim 1, wherein the two-dimensional arrangement comprises data source symbol marks based on which a data source with defined pieces of data is determined that are linkable with the points of intersection of the grid.

8. Method according to claim 1, wherein, in a preceding process step, a three-dimensional arrangement of symbol marks is transmitted to multiple adjacent two-dimensional arrangements of symbol marks, and then is decoded.

* * * * *